United States Patent [19]

Kasuga et al.

[11] Patent Number: 5,056,201
[45] Date of Patent: Oct. 15, 1991

[54] METHOD OF MAKING A TRAVELLING-WAVE MOTOR

[75] Inventors: Masao Kasuga; Takayuki Mori; Nobuo Tsukada, all of Tokyo, Japan

[73] Assignee: Seiko Instruments Inc., Japan

[21] Appl. No.: 553,758

[22] Filed: Jul. 13, 1990

Related U.S. Application Data

[62] Division of Ser. No. 291,459, Dec. 29, 1988, Pat. No. 5,006,746.

[30] Foreign Application Priority Data

Dec. 29, 1987 [JP] Japan ................................ 62-332501
Sep. 1, 1988 [JP] Japan ................................ 63-1543[U]

[51] Int. Cl.$^5$ ............................................. H01L 41/22
[52] U.S. Cl. ................................... 29/25.35; 310/323
[58] Field of Search ............... 29/25.35, 596, 25.42; 310/323, 328, 312

[56] References Cited

U.S. PATENT DOCUMENTS

| | | | |
|---|---|---|---|
| 4,562,374 | 12/1985 | Sashida | 310/323 X |
| 4,786,836 | 11/1988 | Tokushima | 310/323 |
| 4,788,468 | 11/1988 | Izukawa et al. | 310/323 |
| 4,829,209 | 5/1989 | Kawasaki et al. | 310/323 |

Primary Examiner—Carl E. Hall
Attorney, Agent, or Firm—Bruce L. Adams; Van C. Wilks

[57] ABSTRACT

A travelling-wave motor utilizes a flexible travelling waves generated in a stator for driving a rotor. The stator has an elastic vibrating body and a ceramic piezoelectric vibrator provided on one side of the elastic vibrating body. The central portion of the vibrating body is locked and supported on a central axis provided on a ground way. An output extracting projection for driving inside of the outermost periphery of the vibrating body on the one of the vibrating body and the rotor to press and contact with each other. The vibrating body and the piezoelectric vibrator is excited radially in a primary vibration mode.

5 Claims, 12 Drawing Sheets

METHOD OF MAKING A TRAVELLING-WAVE MOTOR

This is a divisional, of application Ser. No. 291,459, filed Dec. 29, 1988, now U.S. Pat. No. 5,006,746.

BACKGROUND OF THE INVENTION

This invention relates to a travelling wave motor, e.g. a compact ultrasonic motor using ultrasonic oscillation and having an electro-mechanical transducer for generating a travelling-wave and a movable member driven by the travelling wave.

One known ultrasonic motor is a standing-wave type motor which employs a Langevin oscillator as a driving source. Such a motor is disclosed in U.S. Pat. No. 4,019,073. Another known ultrasonic motor is a travelling-wave type motor employing a travelling wave generated on a stator for driving a rotor provided on the stator. The travelling-wave motor generates smaller wear in the friction-transmission surface between the stator and the rotor, and can more easily be driven in the reverse rotation direction by comparison with the standing-wave type motor. Such a travelling-wave motor is disclosed in U.S. Pat. No. 4,513,219 (Katsuma et al), U.S. Pat. No. 4,562,374 (Sashida) and EP-A-169,297 (Tokushima).

Figure 2:
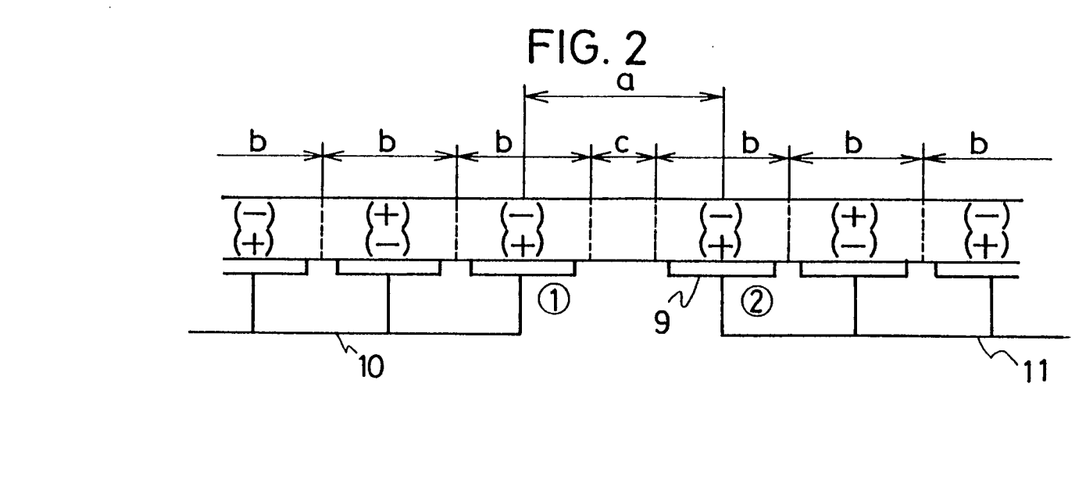
FIG. 2 is a principle drawing of a travelling wave generation.

FIG. 2 represents one example of a traveling wave generation principle in the travelling-wave motor. A reference numeral 1 denotes a piezoelectric transducer consisting of piezoelectric ceramic, piezoelectric crystal, which is polarized at equal intervals by a width b with the adjacent polarizations opposite each other in direction as illustrated. An electrode 2 is formed on each piezoelectric transducer through evaporating or plating a conductive material such as silver, nickel or the like, and these electrodes are connected by signal lines 10, 11 each to have a high frequency voltage impressed thereon from a different signal source. Then, a void c in width is provided between electrode groups connected by the signal lines 10, 11 each. In this case, the void c in width may have nothing of presence of the polarization and the electrode. Here, the distance between centers of the electrodes across the width c will be denoted by a for the convenience of description. A mechanism of the travelling wave generation will be described with reference to FIG. 2 and reference characters given therein. An inflected vibration wave consisting of travelling wave and regressive wave may be expressed by the following equation from taking the midpoint of an electrode portion as a reference.

$$A \sin(\omega t - kx) + A \sin(\omega t + kx) \tag{1}$$

Here, (a) indicates a so-called standing wave. Then, an inflected vibration wave on an electrode portion may be expressed as follows.

$$B \sin\{\omega t - k(x+a) + \phi\} + B \sin\{\omega t + k(x+a) + \phi\} \tag{2}$$

were
$K = \omega/v = 2\pi/\lambda$
$\lambda$: wavelength, $\phi$: phase difference angle
In Eq. (2), where $$-ka + \phi = a\pi$$
$$ka + \phi = \beta\pi \tag{3}$$

then Eq. (2) may be expressed as:

$$B \sin(\omega t - kx + \alpha\pi) + B \sin(\omega t + kx + \beta\pi) \tag{4}$$

Accordingly, the inflected vibration wave excited by ①, ② may be expressed in a type having Eqs. (1) and (4) put together. Here, if a condition for the presence of a traveling wave only is considered from the development of Eq. (4), it is understood that it comes in the case where $\alpha$ is an even number and $\beta$ is an odd number. Here, a and $\phi$ expressed by equations of $\alpha$ and $\beta$ may be given as follows from Eq. (3).

$$a = \frac{\lambda}{4}(\beta - \alpha) \tag{5}$$

$$\phi = \frac{\pi}{2}(\alpha + \beta)$$

That is, when $(\alpha,\beta) = (0,1), (2,3), a = \frac{\lambda}{4}, \phi \frac{\pi}{2}$, when $(\alpha,\beta) = (2,1), a = -\frac{\lambda}{4}, \phi = \frac{3}{2}\pi$, when $(\alpha,\beta) =$ $(0,3), a = \frac{3}{4}\lambda, \phi = \frac{3}{2},$ and thus the travelling wave component only is present when a and $\phi$ are satisfied each concurrently. If, for example, the case where $$a = \frac{3}{4}\lambda, b = \frac{\lambda}{2} \text{ and } \phi = \frac{3}{2}\pi,$$

is considered, then Eq. (1)+Eq. (2) will be:

$$A \sin(\omega t - kx) + A \sin(\omega t + kx) + B \sin(\omega t - kx) - B \sin(\omega t + kx) \tag{6}$$

Here, if amplitudes A and B of a high frequency voltage signal generated from a driving circuit are A=B, then Eq. (6) will be 2A sin ($\omega t - kx$), and thus it is understood that the travelling wave component only remains. Further, for reversing drive the regressive wave component only will be made to remain, therefore and B in Eq. (5) will be inverted, thus $\alpha$ and $\beta$ being odd and even respectively. When considered with reference to ① practically, a phase of the signal to be applied to ② may be shifted 180° as compared with the case of forward drive.

Figure 3:
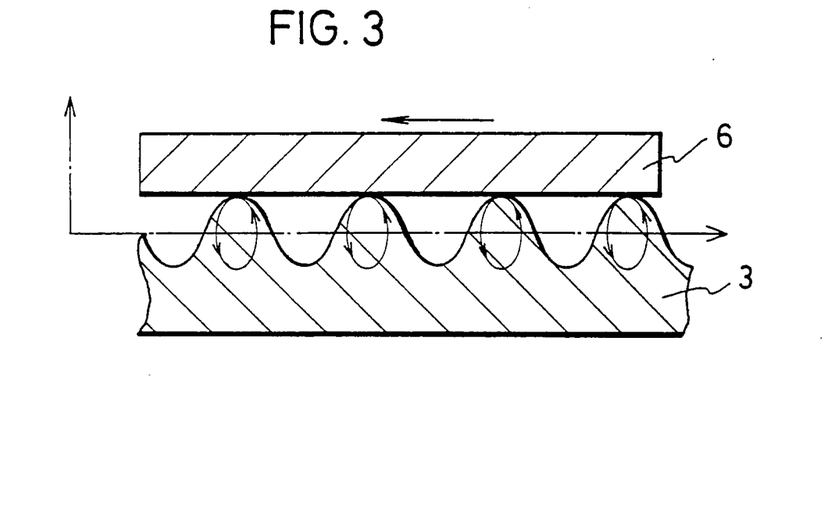
FIG. 3 is a principle drawing of a travelling-wave motor rotation.

FIG. 3 represents a principle on which the travelling-wave motor runs according to a travelling wave component. A reference numeral 3 denotes a vibrator part, which may generate an inflected vibration as the piezoelectric vibrator is bonded to an elastic member. Now, when a travelling wave is generated rightward on the principle shown in FIG. 2, one spot on the surface of the vibrator part 3 draws a leftward elliptic path, therefore a rotor part 6 moves counter to the direction in which the travelling wave goes. The above is so reported in NIKKEI MECHANICAL (Sept. 23, 1985) and others, and a detail description on one spot on the surface of the vibrator part 301 drawing an elliptic path is also given therein.

Figure 4:
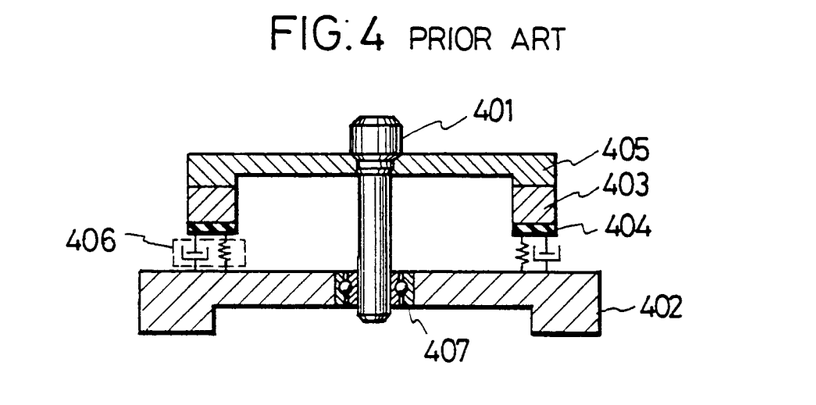
FIG. 4 and FIG. 5 are longitudinal sectional views of a prior art travelling-wave motor.

Katsuma et al. and Sashida disclose a travelling-wave motor employing a Ling type piezoelectric member. FIG. 4 shows one of this type travelling-wave motor. This type of travelling-wave motor essentially consists of an annular vibrating body 403 and movable body 405 provided thereon. The vibrating body has as annular piezoelectric vibrator 404 thereon. The vibrating body 403 is fixed to a base 402 through a supporting mechanism 406. On the annular piezoelectric vibrator, a gap having a length of half of the arc of an electrode is provided between two electrode groups. The travelling wave is brought about by applying a AC signal having a phase difference of 90° to the two groups.

Figure 5:
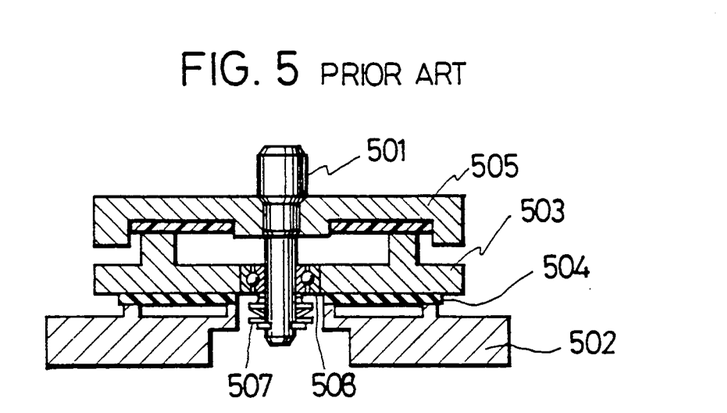
Figure 6:
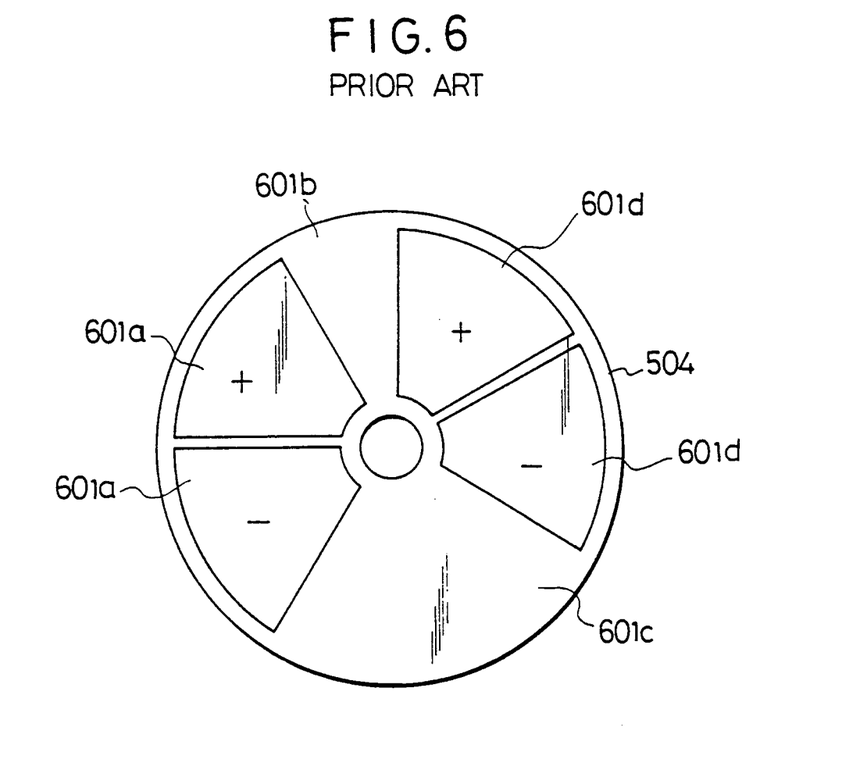
FIG. 6 is plan view showing an electrode pattern for a piezoelectric element of a prior art travelling-wave motor.

Another type of travelling-wave motor employing a disk-shaped piezoelectric member is disclosed in the European Patent of Tokushima. FIG. 5 shows this type of travelling-wave motor. In the figure a stator is constituted by a disk-shaped resilient vibrating body 503 having a toothlike circular projection. The vibrating body 503 has a disk-shaped piezoelectric vibrator 504 thereon. A movable body 505 is provided on the projection of the vibrating body and has a central shaft to act as a rotational guide. A pressure-regulating device is provided on the central shaft for effecting a suitable contact pressure between the vibrating body and the movable body so that the travelling wave component can be efficiently transmitted to the movable body. The vibrating body is supported and fixed on two circular projections formed on a base. The disk-shaped piezoelectric vibrator consists of a plurality of electrodes arranged in such a manner that an electrode pattern 601a divided at equal intervals is provided on almost semicircular portion of one side plane of it as shown in FIG. 6 and an electrode pattern 601d divided at equal intervals likewise is provided on remain almost semicircular portion through blank areas 601b and 601c left in 0.5 pitches and 1.5 pitches on opposite end portions. The piezoelectric vibrator is polarized so that the adjacent electrode patterns is in the counter direction.

For mounting in this case, almost semicircular metallic plates, for example, are bonded conductively at every almost semicircular electrode blocks to homopolarization electrically, and signals 90° different in phase are impressed thereon through two lead wires, thereby generating a travelling wave.

In a travelling-wave motor of the type described above, if its construction includes an annular vibrating body, the travelling wave is significantly damped to a certain degree due to the required supporting structure since the flexure mode travelling wave which has been excited by the piezoelectric vibrator has no nodal point of oscillation. As a result of this, the electro-mechanical transducing efficiency is low.

If the construction of the travelling-wave motor includes a disk-type of vibrating body, there is the advantage that the vibrating body can be fixed and supported by the base at two places in the radial direction of the base because the vibrating body is excited in a secondary oscillation mode in the radial direction of the vibrating body, however, in the case of a thin and small sized travelling-wave motor which is an object of the invention, a deterioration of efficiency is also quite unavoidable according to a dispersion of node positions and dimensions of the supporting area and force, and since a driving frequency exceeds 100 kHz for excitation in the secondary vibration mode, a deterioration of circuit efficiency may result.

If the piezoelectric element having the electrode patterns shown in FIG. 4 is used, one standing wave is excited on one semicircular portion, a standing wave 90° different in phase therefrom is excited on the other semicircular portion, the standing waves different each other are propagated to the semicircular portions on the counter side mutually, and the two standing waves are thus synthesized to generate a travelling wave, therefore a source for generating the two standing waves comes one-sided to the semicircle, and thus a uniform travelling waves cannot be excited. As one quantitative data indicating such phenomenon, for example, some peaks called "spurious" peaks can be observed other than a rise at the resonance point in frequency-amplitude characteristics. Consequently, an electric-mechanical transduce efficiency of the motor detoriorates.

SUMMARY OF THE INVENTION

It is therefore an object of the present invention to provide a travelling-wave motor having a thin shape and small diameter.

It is another object of the present invention to provide a travelling-wave motor with a low electricity consumption.

It is a further object of the present invention to provide a travelling-wave motor which has a high electrical-mechanical translation efficiency.

It is a still further object of the present invention to provide a travelling-wave motor which is driven by low driving frequency signals.

It is a yet further object of the present invention to provide a travelling-wave motor in which an amplitude of the vibrator is less attenuated as compared with the prior art structure.

These and other objects of the invention are acomplished by a travelling-wave motor utilizing flexible travelling waves generated in a vibrating body for driving a movable body comprising a ground way for fixing the travelling motor, the ground way having a supporting means, a vibrating body secured and supported in such a manner that the vibrating body is integrated with the supporting means, a piezoelectric vibrator secured to one side of the vibrating body for exciting travelling waves in a primary oscillation mode with respect to the radial direction in the vibrating body, a movable body provided on the vibrating body, an annular projection provided on the one of the vibrating body and the movable body so that the vibrating body comes into contact with the movable body through the projection at a portion inside of the outermost periphery of the vibrating body, and a pressure-regulator provided on the movable body for generating suitable contact pressure between the movable body and the vibrating body. The supporting means may be constituted by a support shaft which acts as a center of rotation of the movable body. The pressure-regulator may be fixed to the shaft. The annular projection may be provided on the movable body. The annular projection may include a toothed displacement. The movable body may have another annular projection at the contact position with the projection of vibrating body. The breadth of the annular projection of the movable body may be narrower than that of the vibrating body. The thickness of the vibrating body at a position inside the annular projection may be thinner than that at a position outside the annular projection. The supporting means may be made from a conductive material. The piezoelectric vibrator may be formed in a disk shape and has a central hole. The piezoelectric vibrator may have electrode patterns thereon. The electrode patterns may include a electrode pattern divided into a plurality of divided electrode at equal intervals by multiple of four and two short circuit patterns for short-circuiting so that the divided electrode are alternately connected with the short circuit patterns to form two sets of electrodes. The piezoelectric vibrator may be polarized so that every portions on which one group consisting of two adjacent divided electrodes are formed are polarized alternately into positive and negative potential. The piezoelectric vibrator may have a circular blank portion at the outermost periphery thereof. The piezoelectric vibrator may have a circular blank portion at the periphery of the central hole. One of the divided electrodes may have a marking pattern.

DETAIL DESCRIPTION OF THE PREFERRED EMBODIMENTS

Figure 1:
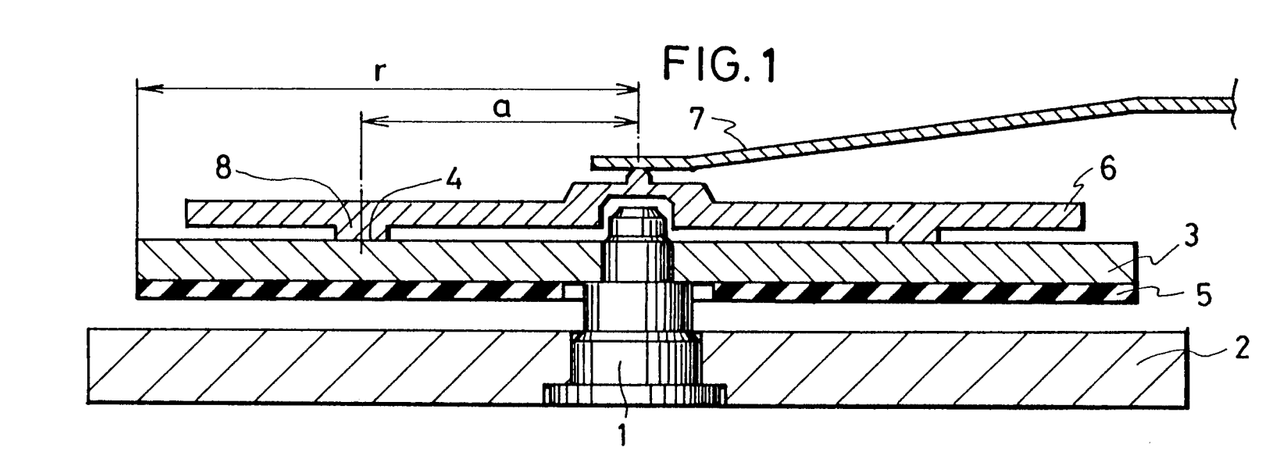
FIG. 1 is a longitudinal sectional view of a travelling-wave motor relating to the invention.

FIG. 1 is a longitudinal sectional view of a travelling-wave motor relating to the invention. A central support rod 1 is unified with a ground way 2 through screwing or driving, and further a vibrator part 3 is unified in structure with the central support rod at the central portion. In this case, the vibrator body 3 consists of an elastic member such as stainless steel, brass, duralumin or the like and is supported substantially on the central support rod 1 at the central portion. Then, a mechanical resonance frequency of the central support rod 1, the ground way 2 is sufficiently higher than that of vibrator body 3, piezoelectric transducer 5 and others, and the structure is that vibration leakage and attenuation will almost not arise due to an influence of the support. The piezoelectric transducer 5 is a piezoelectric ceramic of at least one or more with a hole provided at the center or a piezoelectric ceramic consisting of several segments divided around, and that of having several patterns of electrodes provided around to polarization is joined on a counter side to the surface of the vibrator body 3 where an output extracting position 4 is provided. The central support rod 1 may consist of a conductive material such as a metal. In such case, the back electrodes provided on the back side contacting with the vibrator body is electrically contacted with the central support rod through the vibrator body. With the central support rod 1 as a guide for the center of rotation, a moving body 6 is disposed so as to come in contact with a portion of the output extracting position 4 set on the vibrator body 3 by a pressure regulating spring 7. In this embodiment, the pressure regulating spring 7 is platelike and set at a portion other than the ground way 2 or the travelling-wave motor relating to the invention, and is arranged so as to apply pressure to a projection provided at the central portion of the moving body 6.

In this case, if a pressure generated on the moving body 6 by the pressure regulating spring 7 is N, a friction factor between the vibrator body or part 3 and the moving body 6 is M, and a distance from the center of the vibrator part 3 to the output extracting position 4 is a, then a torque T arising on the moving body 6 may be T=MNa or so. The output extracting position 4 is set so as to translate an infinitesimal flexural vibration amplitude of the travelling wave component excited by the vibrator consisting of the vibrator part 3 and the piezoelectric transducer 5 efficiently into a rotational motion of the moving body 6, which may be realized by providing a projection whereby the vibrator part 3 and the moving body 6 are brought into contact with each other only at one least one of the vibrator part 3 or the moving body 6. In this embodiment, the projection comprises a circular protrusion 8 provided on the moving body 6 so as to contact with the vibrator body 3 at the output extracting position 4.

Generally a component of the elliptic path produced by a travelling wave which contributes to a rotation of the moving body has a speed difference and a phase shift in the circumferential direction at each position radially of the vibrator part 3, therefore these factors lead to braking of the rotational motion of the moving body 6 resultingly as an auto-rotation component. Accordingly, it is preferable that a flexural vibration be extracted by providing the output extracting position 4 radially at a part of the vibrator part 3 or the moving body 6 as described above. Meanwhile, what is most characteristic of the invention is the output extracting position 4. That is to say, in the field of relatively small size and low power consumption, the travelling-wave motor relating to the invention is of small structure, therefore the mechanical resonance frequency of the vibrator becomes inevitably high. Generally, a frequency exceeding 100 kHz may lead finally to a deterioration of circuit efficiency of the driving system, therefore if the number of waves arising around the vibrator is 2 to 4, it must be excited by a primary vibration mode radially. When excited practically on the driving frequency working to be the primary vibration mode, the amplitude gets larger as it get nearer to the outside diameter and is maximized at the outermost periphery. Accordingly, it is conceivable that the output extracting position be set at the outermost periphery of the vibrator, whereat the moving body 6 may be brought into contact therewith, however, if the moving body 6 is brought into contact at the amplitude-maximized position, a general amplitude of the vibrator will practically be attenuated to an extreme, thus obtaining only such rotational motion as is weak in torque at best. That is, a pressure by the pressure regulating spring 7 cannot be set high, and the motor efficiency comes to a low value. On the other hand, the closer the output extracting position 6 is set to the inner periphery, the less an amplitude arising on the vibrator is attenuated, however, if it is set so consciously of the central axis, then since the amplitude itself at the portion is small, only a weak rotational motion may result, too. Accordingly, if the radius of the vibrator part 3 is r, there exists some optimum value in the relation with the distance a from the center to the output extracting position 4. Then, in the case of a vibrator 5 mm in radius and 1 mm or below in thickness, the optimum value varies according to the diameter of the central support rod 1, however, it is set preferably at about $2/5r \leq a \leq 4/5r$ for the motor efficiency. A detailed description will be given thereof hereinlater.

As described above, when exciting at a driving frequency whereat the vibrator part 3 and the piezoelectric transducer 5 get in a primary vibration mode radially, it is desirable that the output extracting position 4 for driving the moving body 6 frictionally be set at a portion inward rather than the outermost periphery of the vibrator part 3 for better efficiency of the motor. Then, in the embodiment, the case where the projection 8 working at the output extracting position 4 is set on the moving body 6 side, and the diameter of the moving body 6 may be smaller than the outside diameter of the vibrator part 3 and substantially larger than the distance a.

Figure 7A:
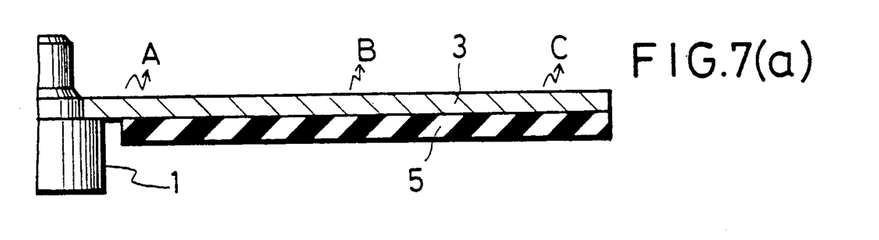
FIG. 7(a) is a partial sectional view representing amplitude measuring points.
Figure 7B:
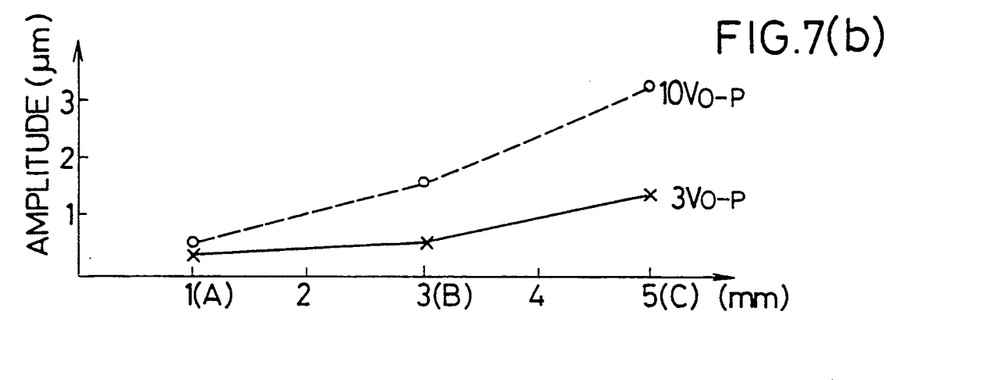
FIG. 7(b) is a drawing representing the relationship between the amplitude measuring points and the amplitude when vibrator part is made from the stainless steel.
Figure 7C:
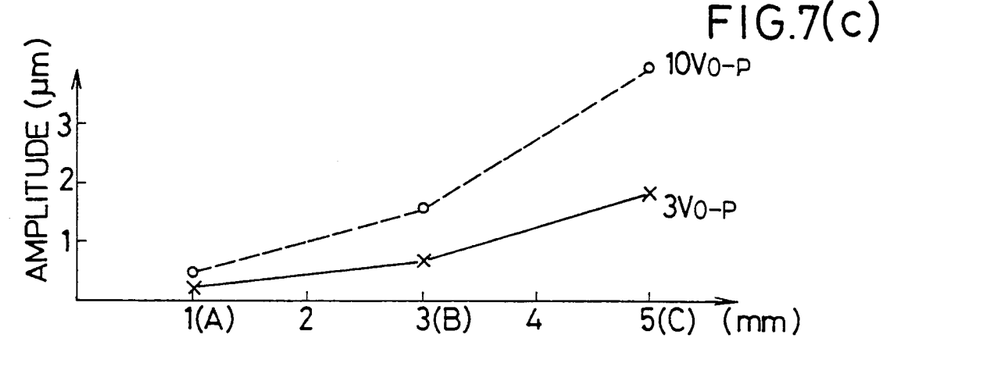
FIG. 7(c) is a drawing representing the relationship between the amplitude measuring points and the amplitude when vibrator part is made from the brass.

FIGS. 7(a) to 7(c) indicate a radial behavior of the travelling-wave motor relating to the invention, wherein (a) FIG. 7 is a fragmentary longitudinal sectional view of the travelling-wave motor relating to the invention, indicating amplitude measuring portions different in position radially as A, B and C. For amplitude measuring method practically, since the travelling-wave motor of the invention is thin and small in size, and an influence of dead weight of the contact type displacement meter cannot be neglected, an optical non-contact type displacement meter is used. FIGS. 7(b) and (c) diagram amplitudes measured at each radial point of A, B and C with a travelling wave excited on a vibrator part 3 and a piezoelectric transducer 5. Curves are obtained in this case with the number of waves excited in the circumferential direction as 3, outside diameter and thickness of the vibrator part 3 and the piezoelectric transducer 5 as 10 mm and 0.3 mm respectively, and a vibration voltage set at 3 Vo-p and 10 Vo-p in two ways. FIG. 7(b) indicates the case where the vibrator part 3 is of stainless steel material, a radial primary mechanical resonance frequency being about 45 kHz, and FIG. 7(c) indicates the case where the vibrator part 3 is of brass material, a radial primary resonance frequency being about 39.5 kHz. From comparing FIG. 7(b) with (c), it is understood that a radial displacement distribution gets progressively larger as it comes near to the outer periphery generally and is maximized at the outermost periphery.

Figure 8A:
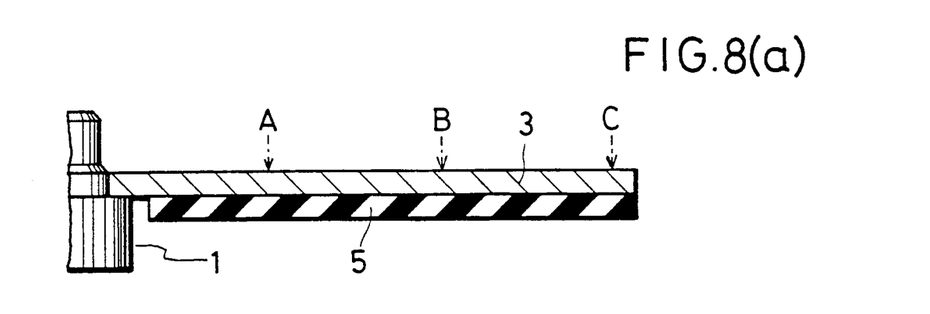
FIG. 8(a) is a partial sectional view representing output extracting positions.
Figure 8B:
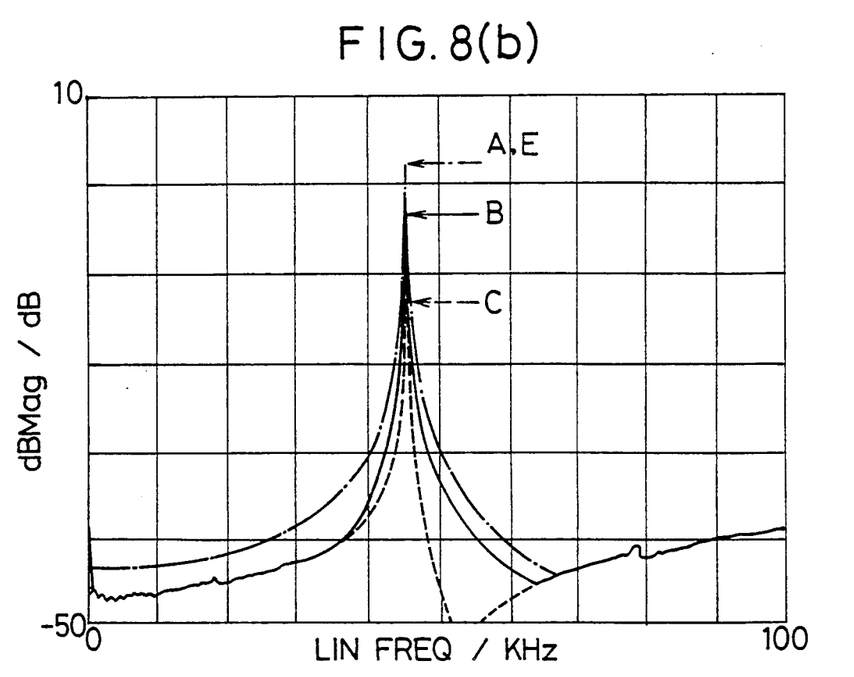
FIG. 8(b) is an explanatory drawing representing a difference of output extracting position when the vibrator part is made from stainless steel.
Figure 8C:
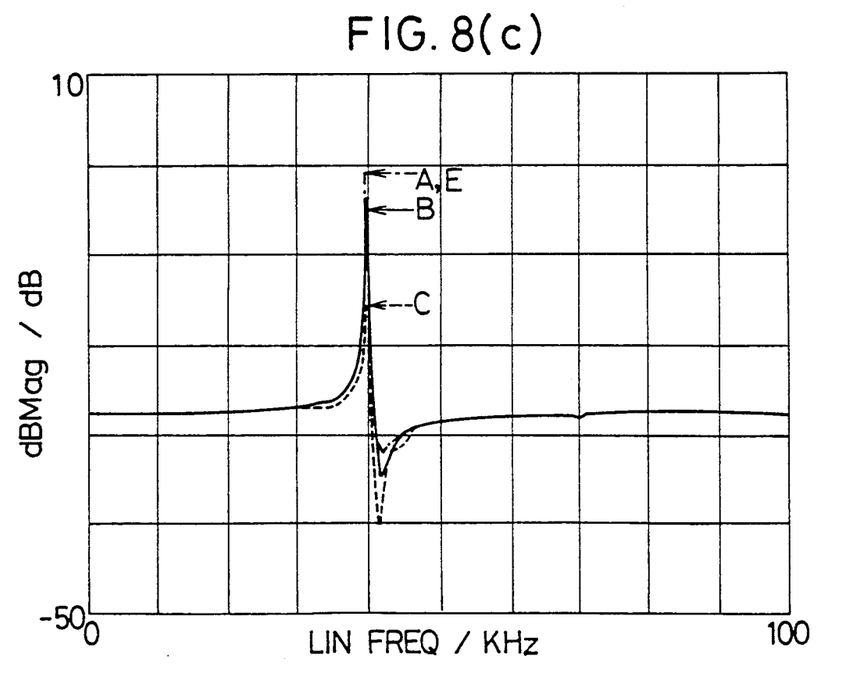
FIG. 8(c) is an explanatory drawing representing a difference in amplitude of a vibrator due to a difference of output extracting position when the vibrator part is made from brass.

FIG. 8(a) to 8(c) indicate a disparity in amplitude of the vibrator due to a difference in the output extracting position, illustrating a disparity in amplitude of the vibrator part due to a difference in position whereat the vibrator part and the moving body come in contact with each other. As in the case of FIG. 7(a), FIG. 8(a) is a fragmentary longitudinal sectional view of the travelling-wave motor relating to the invention. With portions A, B and C different in position radially as output extracting positions and the moving body coming in contact substantially with a vibrator part 3 only at portions A, B and C, each frequency characteristic of the vibrator was measured. That is, strap projections which come in contact with each position of A, B and C are set on the moving body, and each moving body is remounted successively on the vibrator part 3, thereby comparing attenuations of the vibrator amplitude. The dead weight of the moving body is 0.3 g in this case. A piezoelectric transducer 5 being constituted of two circuits, the method for measuring frequency characteristics of the vibrator amplitude comprises a technique wherein a cycle voltage is swept to ignition on one circuit, thereby subjecting the vibrator to a standing wave excitation, and a back electromotive force generated on the other circuit side according to a piezoelectric effect is subjected to Fourier conversion by a spectrum analyzer. FIGS. 8(b) and (c) diagram an attenuation mode of the amplitude near a mechanical resonance point of the vibrator by remounting successively the moving bodies coming in contact only with each position of A, B and C through the aforementioned technique practically. Forms of the vibrator part 3 and the piezoelectric transducer 5 are the same as those of FIG. 7 in this case, and the impressed voltage is 5 Vo-p.

The vibrator part 3 is of stainless steel material, and (c) represents the case where it is of brass material as in the case of FIG. 7. From comparing FIG. 8(b) and FIG. 8(c), it is understood that B is less in the maximum amplitude at a resonance point than A, and C is less than B regardless of the materials, That is, the attenuation increases more and more according as the position whereat the moving body contacts the vibrator part comes near to the outer peripheral portion. The character E in the drawings indicates a frequency characteristic of the vibrator which is examined without mounting the moving body thereon, representing the maximum amplitude. However, there is no distinction observed between A and E as long as the moving body weighing 0.3 g or so is mounted, and a contact of the moving body at the position A is also to obtain an amplitude in the state where the vibrator is almost free.

Now, in synthesizing the results of FIGS. 7 and FIGS. 8, when the traveling-wave motor relating to the invention is excited at a driving frequency working as a primary vibration mode radially, the amplitude progressively increases as it comes near to the outer periphery, however, when the moving body is disposed so as to come in contact only with the outer peripheral portion to the contrary, the amplitude attenuation increases, which is disadvantageous. That is, it can be said that an optimum value may lie in the output extracting position where the moving body and the vibrator part come in contact. Then, considering that the attenuation becomes excessive from setting the value at the outermost periphery but minimized, to the contrary, when it is set at the innermost periphery, and that unless about 1/5 of the portion from the center to radius r is supported on the central support rod 1 for the motor structure, something disadvantageous may result in strength against pressure applied by the moving body, it is preferable that the output extracting position from the vibrator to the moving body be set at about $2/5r \leq a \leq 4/5r$. In consideration physically of the above phenomenon, vibrations of the vibrator part and the piezoelectric vibrator in a free state at the portion will be effective in minimizing the attenuation of an infinitesimal elliptic vibration generated on the surface of the vibrator part, which may be translated into a rotational motion of the moving body. Then, an optimum position may be decided on the output extracting position according to the outside diameter and thickness of the vibrator part and the piezoelectric transducer and difference in pressure of the moving body, however, the value will be set at $2/5r \leq a \leq 4/5r$, and thus a high efficiency and smooth rotational motion may be realized even at low voltage on the travelling-wave motor relating to the invention.

According to the aforementioned construction, since the primary vibration mode is utilized diametrically of the vibrator part, a driving frequency can be lowered, and as the moving body is pressed and contacted at the output extracting position set on a portion inside of the outermost periphery of the vibrator part, an amplitude of the vibrator part is less attenuated as compared with the case where the moving body is brought into contact with an outer peripheral portion of the vibrator part which is a displacement-maximized portion, thus translating efficiently into a rotational motion of the moving body.

Further, the vibrator part is locked and supported at the center thereof so as to be integral with the central support rod, therefore even such thin and small-sized vibrator part can stably and easily be supported without attenuating the travelling wave in most cases.

Figures 9, 10, 11:
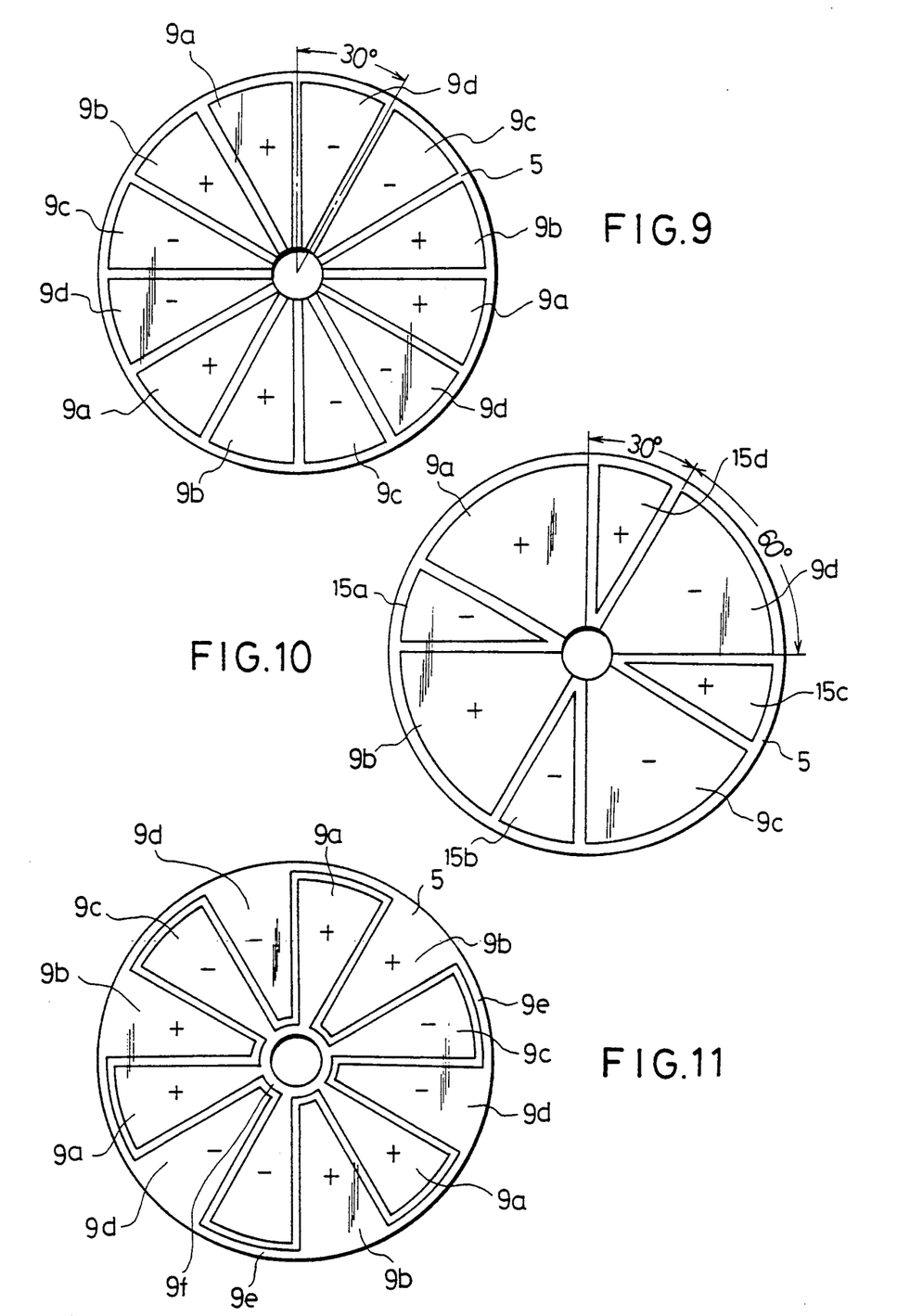
FIG. 9 is a plane view showing an electrode pattern for a piezoelectric element.
FIG. 10 is a plane view showing another electrode pattern for a piezoelectric element.
FIG. 11 is a plane view showing another electrode pattern for a piezoelectric element.

FIG. 9 and FIG. 10 are plan views showing an electrode pattern of the piezoelectric transducer for travelling wave excitation, indicating a concrete electrode pattern of the piezoelectric transducer joined on one side of the travelling-wave motor relating to the invention and capable of realizing a travelling wave excitation.

FIG. 9 shows segmentary electrodes 9a to 9d provided on one side of a piezoelectric vibrator 5 provided with a hole at the central portion, and an arc length of each electrode is set to be almost ¼ of an excited travelling wavelength including a clearance between the adjacent electrodes. With a polarization applied as illustrated, the same signal is impressed to 9a and 9c and a signal shifting 90° in phase is impressed to 9b and 9d, thereby exciting the travelling wave. Then, as mentioned hereinbefore, since the arc length of each electrode is ¼ wavelength, 1 wavelength is formed of 4 portions of 9a to 9d. Accordingly, the embodiment represents the case where the number of waves is 3. A reference character + in the drawings indicates that a plus field is applied to the electrodes on the back to polarization, and that of—indicates that a minus field is applied to the electrodes on the back to polarization. In this case, the back electrodes may be the same-positioned and same shaped electrodes as the front electrodes or wholly covering electrode.

FIG. 10 illustrates another electrode pattern, wherein segmentary electrodes 9a to 9d are provided on the surface of a piezoelectric transducer 5 having a hole at the central portion, and electrodes 15a to 15d corresponding to almost ½ length of arcs of the electrodes 9a to 9d are provided between the electrode ends. Here, a polarization is applied as illustrated, and when high frequency voltages different in phase are inputted to each electrode of 9a to 9d according to the rule shown in FIG. 2, the travelling wave component will be excited. In this case, another group of electrodes 15a to 15d can be utilized for frequency tracking and speed variation of the travelling-wave motor with level and phase of the counter electromotive voltage generated at the time of vibrator part excitation for detection as detection signals, and also utilized for driving when a spurious vibration generated at the time of vibrator part excitation is microscopic, thereby intensifying the travelling wave component.

FIG. 11 represents another electrode pattern for a piezoelectric element used on a travelling-wave motor according to the invention, wherein segmentary electrode patterns 9a to 9d divided at equal intervals in the circumferential direction are formed on one side plane of the piezoelectric element 5 having a hole at the center, then the adjacent two patterns 9a to 9d are polarized in the same direction and the next two patterns 9c and 9d in the counter direction as illustrated, and after polarization an electrode pattern 9e along the outer periphery for short-circuiting 9a and 9c and an electrode pattern 9f along the inner periphery for short-circuiting 9b and 9d are formed. For electrical polarity, two different electrodes such as outer periphery short-circuiting electrode and inner periphery short-circuiting electrode are disposed alternately, and for direction of polarization the electrodes are disposed in every pair alternately in the counter direction, thus the set coming in four electrodes. Here, a mechanical travelling wave in which the four electrode patterns 9a to 9d form one wave length is generated by impressing signals 90° different in phase in time on the outer periphery short-circuiting electrode and the inner periphery short-circuiting electrode.

As described above, sources for generating the two standing waves different in phase in time do not come one-sided to a semicircle each like FIG. 4 but are disposed uniformly with each other at every ¼ wavelengths covering the overall circumference like FIG. 11, therefore a uniform travelling wave is generated covering the overall circumference.

According to the aforementioned construction, a mechanical travelling wave can be generated simply by mounting two lead wires regardless of the number of waves, and two standing waves can be generated uniformly around the whole piezoelectric element, therefore a uniform travelling wave is generated, waves spurious and will not be observed. Consequently, the electrical-mechanical conversion efficiency is enhanced, the number of lead wires is minimized and the structure is simplified, therefore requirements for miniaturization and curtailment of the production process number may be attained advantageously thereby. FIG. 12(b) shows another electrode pattern of the piezoelectric transducer in which circular blank portions 16 and 17 are provided at the outermost periphery and the periphery of the central hole of the piezoelectric transducer respectively in order to prevent leakage current between the both sides and spark current at the time of applying high voltage for evaporating polarization process derived from excess electrode materials.

If the blank portions 16 and 17 are provided as described above, the back side may have a wholly covering electrode.

Figure 12A:
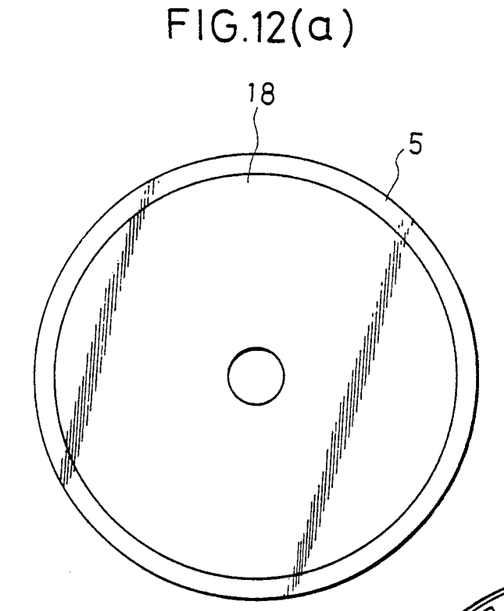
FIG. 12(a) is a plane view showing a reverse side electrode pattern for a piezoelectric element.
Figure 12B:
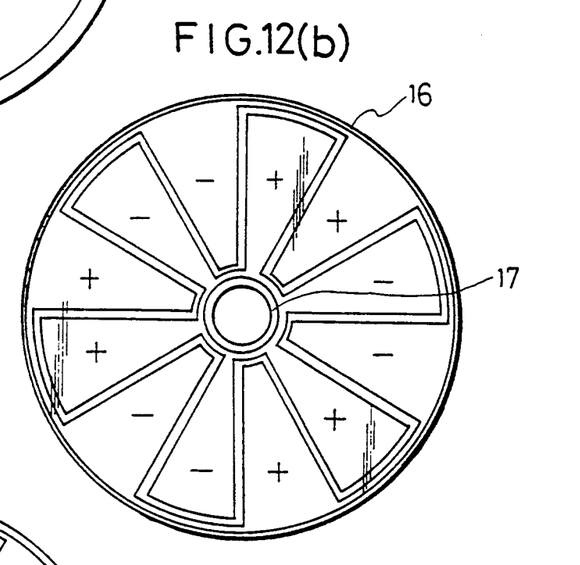
FIG. 12(b) is a plane view showing another electrode pattern for a piezoelectric element.

If a blank portion 18 is provided at the outermost periphery on the back side as shown in FIG. 12(a), the blank portion 16 on the front side may not be required.

Figure 13:
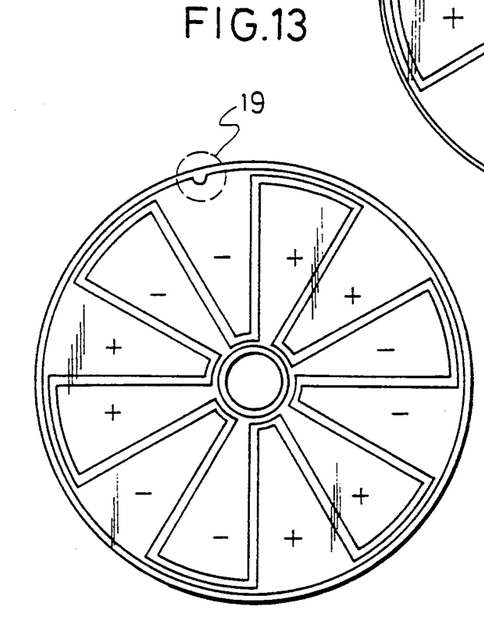
FIG. 13 is a plane view showing another electrode pattern for a piezoelectric element.

FIG. 13 shows another electrode pattern of the piezoelectric transducer in which the outer short circuit electrode has a marking portion 19. The marking portion may be also provided on the inner short circuit electrode. The marking portion is used to distinguish the polarized direction of each electrode at the time of the polarization process and at the time of connecting the lead wires.

Figure 14A:
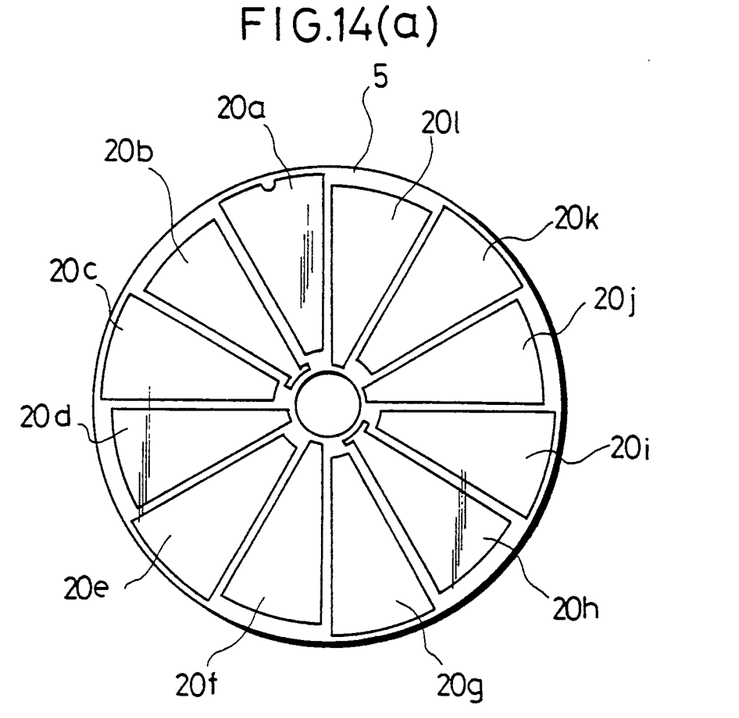
FIG. 14(a) is a plane view showing evaporated divided electrode patterns before polarization process.

FIGS. 14(a) and 14(b) show a process of evaporating electrodes shown in FIG. 13 on the piezoelectric transducer. Before the polarization process in FIG. 14(a), divided electrode patterns 20a to 20l are evaporated on the piezoelectric transducer by using a suitable mask. The divided electrode patterns 20a, 20c, 20e, 20g, 20i, 20k are elongated at the outer periphery. On the other hand the remaining electrode patterns 20b, 20d, 20f, 20h, 20j, 20l are elongated at the central hole. Two electrode patterns 20b and 20h which are opposite to each other have wider portions respectively at the inner end point in consideration of slight rotation of the piezoelectric transducer at the time of evaporation of the electrodes after polarization process.

The pattern may be constructed of a crom film as contact material to the piezoelectric material, a nickel film covering the crom film to effect soldering the lead wire and a gold film covering the nickel film to prevent oxidization and to effect conductivity.

Figure 14B:
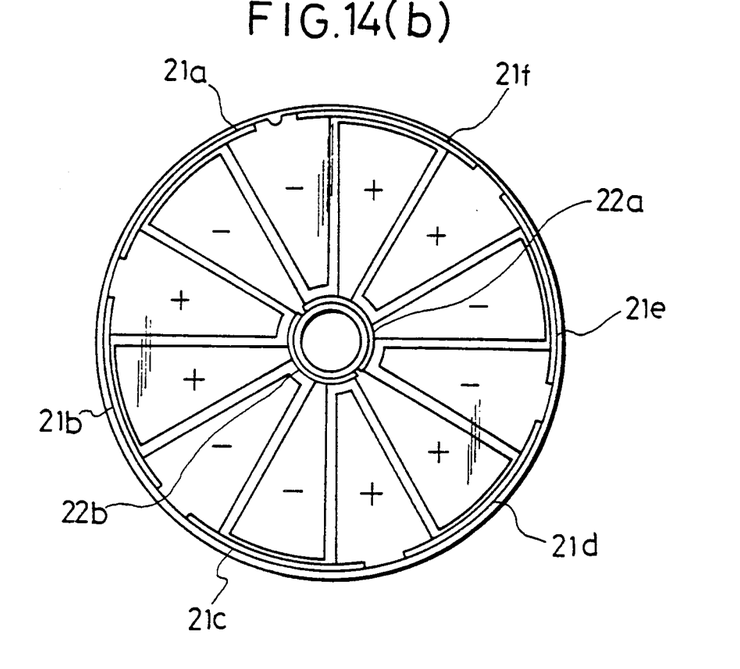
FIG. 14(b) is a plane view showing evaporated divided electrode patterns after polarization process.

After the polarization process, in FIG. 14(b), outer electrode patterns 21a to 21f and inner peripheral pattern 22a, 22b are evaporated to realize the electrode structure shown in FIG. 13.

Figure 15:
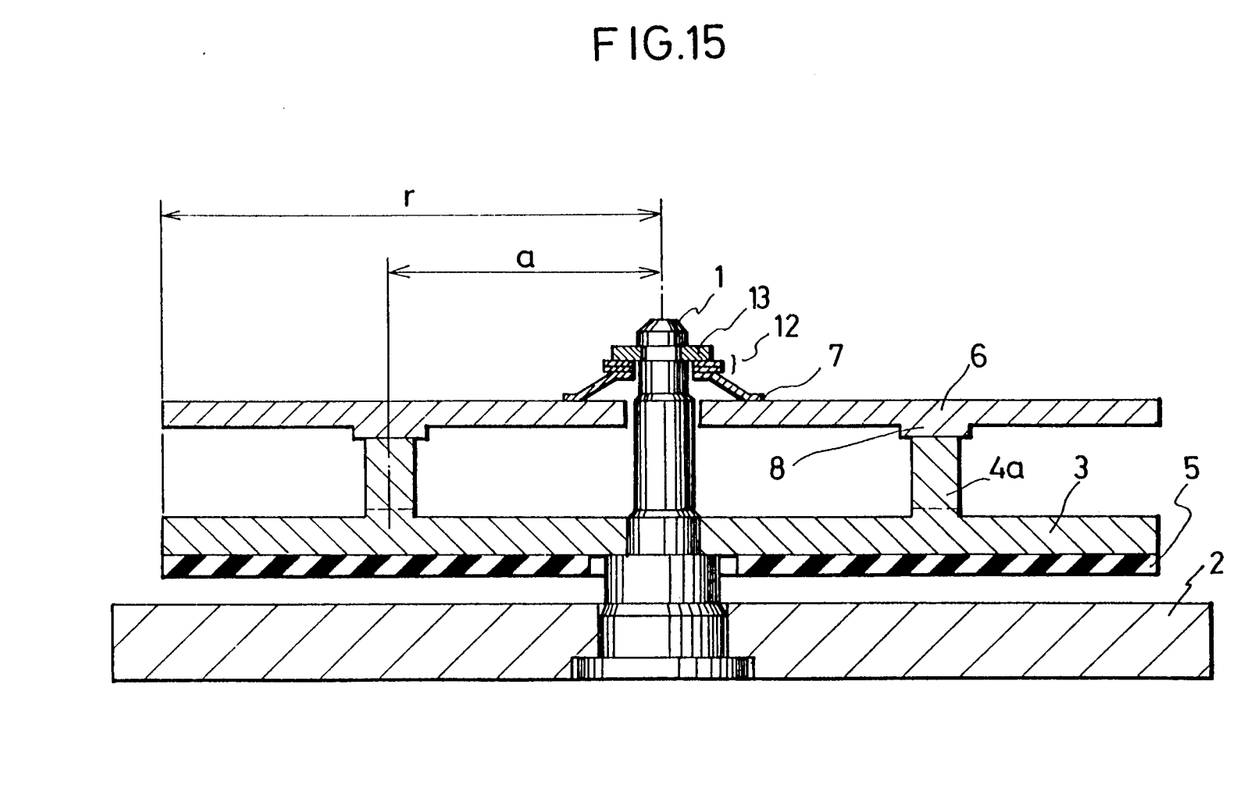
FIG. 15 is a longitudinal sectional view of another travelling-wave motor relating to the invention.

FIG. 15 is a longitudinal sectional view representing another embodiment of the travelling-wave motor relating to the invention. As in the case of FIG. 1, a central support rod 1 is unified with a ground way 2 through screwing or driving, and further a vibrator part 3 is integral in structure with the central support rod 1 at the central portion, thus realizing a center-fixed support structure. What is characteristic of the embodiment is that a toothed displacement enlarging mechanism 4a is provided at the output extracting position where the vibrator part 3 and a moving body 6 come in contact to translate the travelling wave component into a rotational motion. Generally, a maximum value Umax of the lateral speed component of an elliptic path contributing to a rotational motion of the moving body 6 is expressed as:

$$U_{max} = -2\pi^2 f \xi (T/\lambda)$$

f: driving frequency
ξ: longitudinal amplitude
T: thickness of vibrator
λ: travelling wave length therefore, the thickness of the vibrator will have to be increased so as to enhance the rotational frequency. However, a mechanical stiffness excessively increases from merely intensifying the thickness, and the resonance frequency also gets high. Accordingly, it is advisable that the toothed displacement enlarging mechanism 4a which is rugged in strap peripherally of the vibrator part 3 be provided. It is then preferable for the motor efficiency that the displacement enlarging mechanism 4a be set in position radially of the vibrator part 3 at about $2/5r \leq a \leq 4/5r$ as described hereinbefore. Further, the displacement enlarging mechanism 4a may be unified in structure with the vibrator part 3, however, such toothing work will entail a high cost, therefore the displacement enlarging mechanism 4a will be prepared separately and then unified with the vibrator part 3 later. In this case, the displacement enlarging mechanism 4a may also be formed solidly of plastic. Then, different from the platelike pressure regulating spring structure in FIG. 1, a pressurizing mechanism for this moving body 6 in the embodiment is rather compact to comprises a stopper 9 fittable on the central support rod 1, a pressure regulating spring 7 consisting of a cross spring or the like, a washer 12 working also as a pressure regulator and others.

Figure 16A:
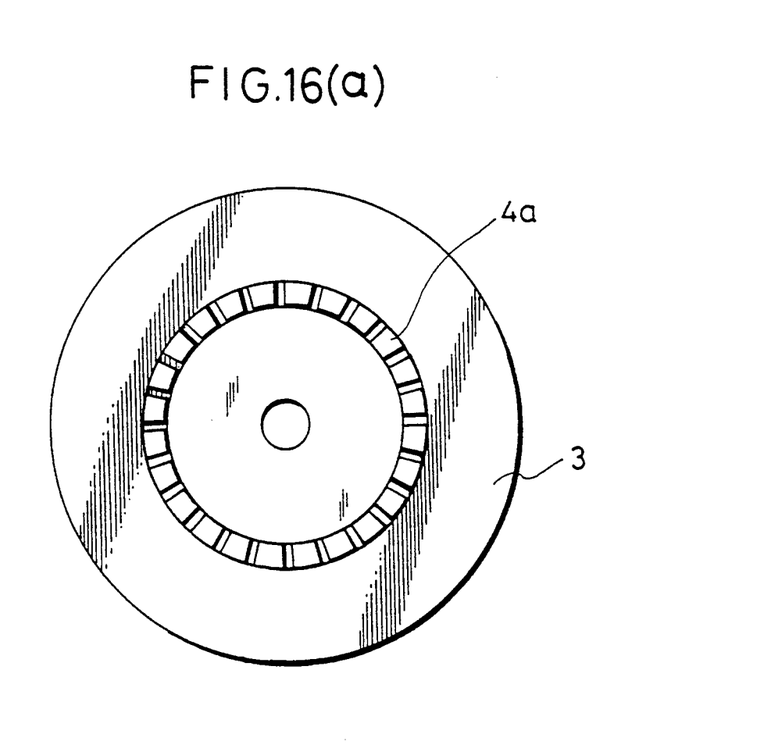
FIG. 16(a) is a plane view showing a vibrator part.
Figure 16B:
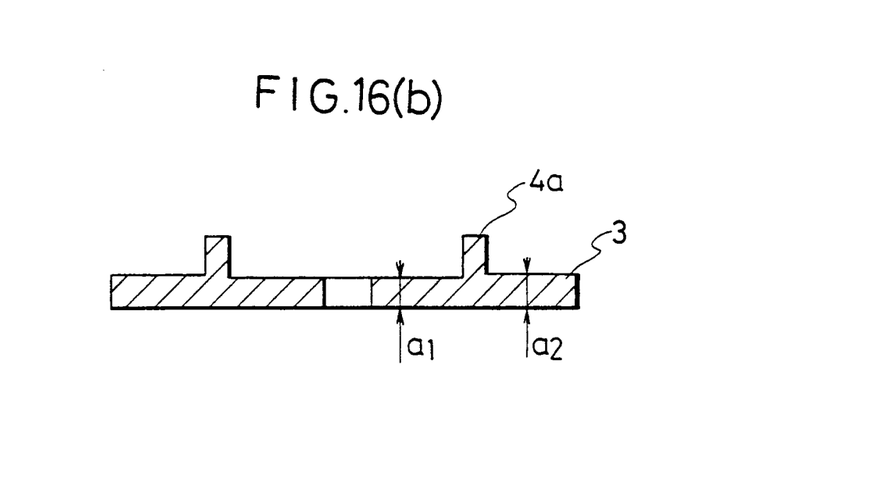
FIG. 16(b) is a sectional view showing a vibrator part.

FIG. 16 represents a concrete example of the displacement enlarging mechanism, wherein a displacement enlarging mechanism 4a toothed with grooves arranged in strap at equal intervals therefor is realized at a portion halfway radially of a vibrator part 3. In this case, if the interval of the grooves is excessively expanded, then a contact area with the moving body decreases and thus the rotational frequency and torque will be thus decreased. Further, if the tooth is kept so high longitudinally, the tooth itself will provide a vibration mode, the displacement enlarging mechanism 4a thus loses the function as a rigid body, thereby leading to a deterioration of the motor efficiency. The thickness of the disk portional inside the displacement enlarging mechanism 4a may be thinner than that of outside portion a2 to effect high efficient of the motor.

Figure 17:
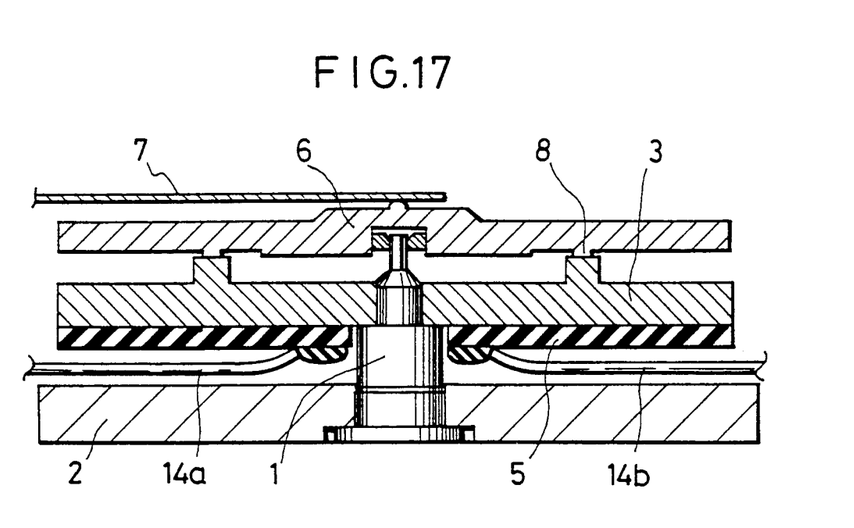
FIG. 17 is a longitudinal sectional view of another travelling-wave motor relating to the invention.

FIG. 17 is a sectional view of the travelling-wave motor according to the invention using an electrode structure of the piezoelectric transducer shown in FIG. 11, wherein a vibrator part 3 having the piezoelectric transducer 5 bonded thereto is supported on a central support rod 1 through driving or the like, and the central support rod 1 is fixed on a ground way 2. A moving body 6 is incorporated from over the vibrator with the central support rod 1 as a guide and pressed onto the vibrator part 3 by a pressure spring 7 thereon. One 14a of two lead wires 14 is mounted on one part of the outer periphery short-circuiting electrodes 9a, 9c, 9e in FIG. 11, and another 14b is mounted on one part of the inner periphery short-circuiting electrodes 9b, 9d, 9f through soldering or the like. Here, the vibrator generates a mechanical travelling wave and the moving body 6 pressed onto the vibrator part 3 rotates from impressing signals 90° different in phase in time on the two lead wires 14.

The breadth of the circuit projection 8 of the moving body 6 may be narrower than that of the tooth-like projection of the displacement enlarging mechanism 4a since if the material of the moving body is softer than that of the displacement enlarging mechanism 4a, the contact portion of the moving body is worn away.

The displacement enlarging mechanism 4a is set in a position radially of the vibrator part 3 at about $2/5r \leq a \leq 4/5r$ as described hereinbefore.

Figure 18:
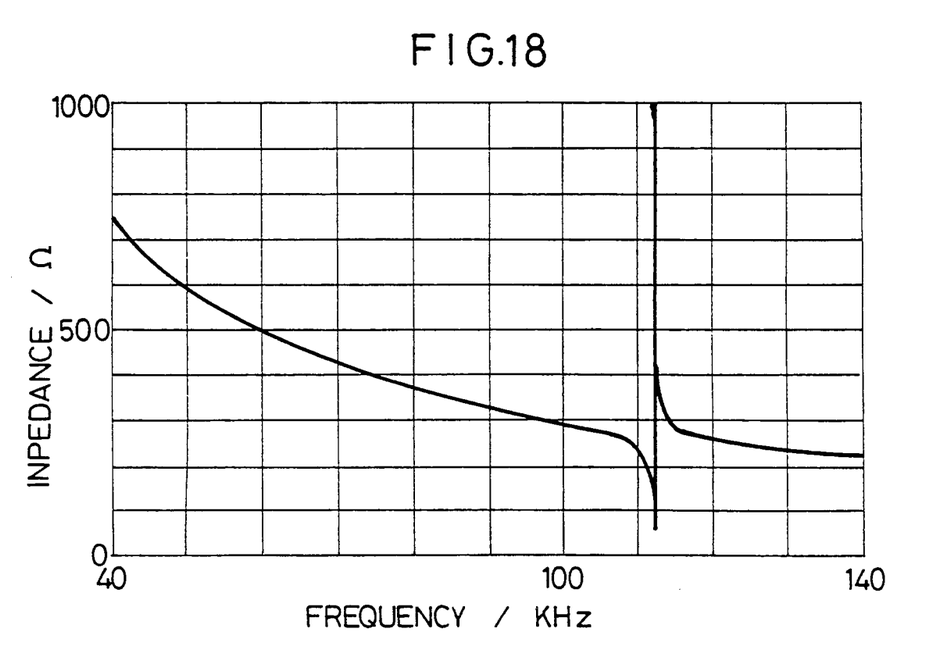
FIG. 18 is a diagram showing a relationship between the applied frequency and the impedance.

FIG. 18 shows one example of impedance characteristic of the travelling-wave motor shown in FIG. 17 at the time of applying high voltage between one of the lead wires and the vibration body 3. The impedance characteristic is measured under condition that the moving body 6 is detached from the main body. The motor is as specified below.

| vibration mode | radial circumferential | primary wave number 3 |
|---|---|---|
| vibrator body | Material | Aluminum |
| | Outside dia. | 10 mm |
| | Thickness | 1 mm (2.2 mm at the projection) |
| piezoelectric transducer | Outside dia. | 10 mm |
| | Thickness | 0.1 mm |
| | Piezoelectric Const. | $130 \times 10^{-12}$ C/N |
| | mechanical Q value | 1500 |

It is understood from the figure that spurious vibration is not observed except at the main resonance point.

Figure 19:
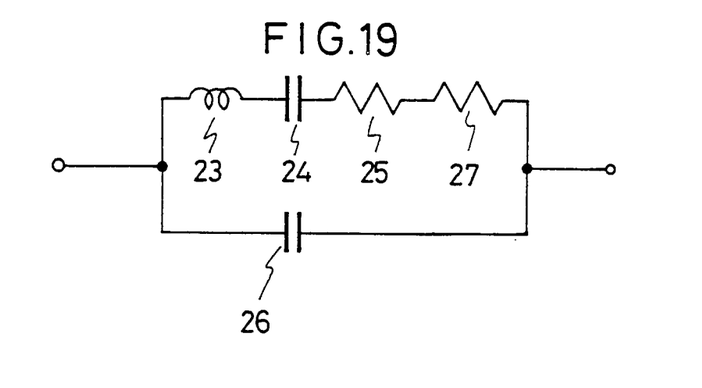
FIG. 19 is an equivalent circuit diagram of the travelling-wave motor.

The travelling-wave motor shown in FIG. 17 is represented as an equivalent electrical circuit shown in FIG. 19. In this figure, 23, 24, 25, 26 and 27 represent the serial impedance, serial capacitance, serial resistance parallel capacitance and load resistance respectively. The value of R1 represents the loss in the travelling motor, e.g. internal loss of the vibrator and mechanical loss at the supporting portion.

Thus, the value of R1 represents the efficiency of the electrode structure of the piezoelectric vibrator.

The equivalent constants of the travelling-wave motor shown in FIG. 17 using the electrode structure shown in FIG. 11 and the travelling-wave motor having the same construction shown in FIG. 17 using the prior electrode structure shown in FIG. 6 are described below.

| | C0(nF) | L1(H) | C1(nF) | R1(Ω) | Q |
|---|---|---|---|---|---|
| Electrode structure in FIG. 11 | 2.8 | 0.25 | 0.0085 | 82 | 2080 |
| Electrode structure in FIG. 6 | 1.8 | 0.36 | 0.0055 | 175 | 1450 |

The R1 value of the electrode structure shown in FIG. 11 is about half of the prior one shown in FIG. 6.

It is understood from the about R1 values that the electrode structure shown in FIG. 11 is more efficient than that shown in FIG. 6.

Figure 20:
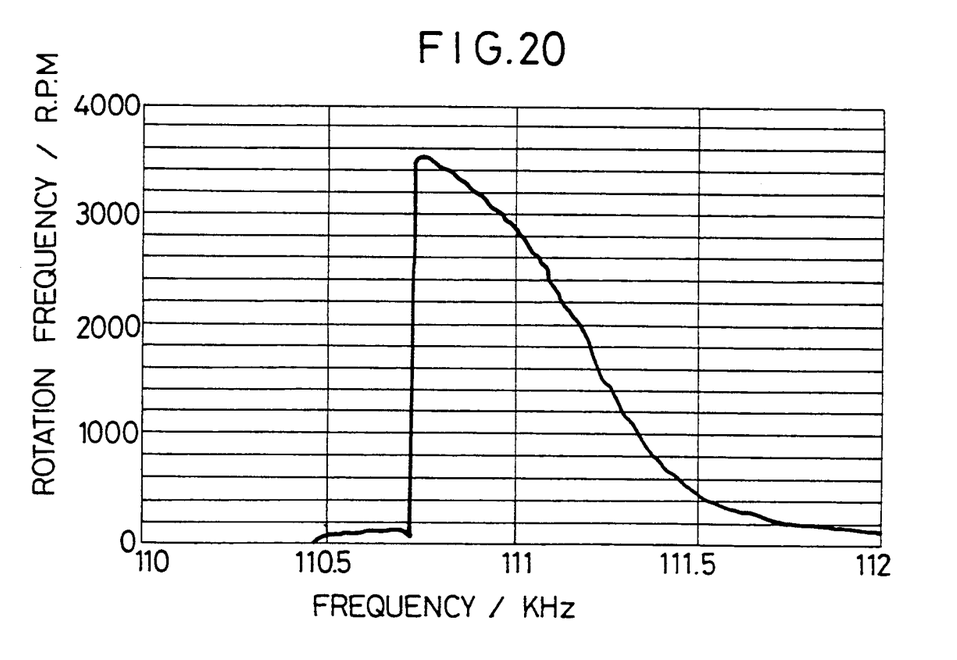
FIG. 20 is a diagram showing a relationship between the applied frequency and the rotation frequency.

FIG. 20 shows one example of the frequency-rotation frequency characteristic of the travelling-wave motor shown in FIG. 17 using the electrode structure shown in FIG. 11. The characteristic is measured under the condition that the driving voltage is a 6 Vp-p sine wave, the contact pressure of the moving body to the vibrating body is about 10 gf. It is understood from the figure the rotation frequency is varied in a relatively wide range and the maximum rotation frequency is over 3000 r.p.m. and a high efficiency operation may be realized on the thin and small-sized travelling-wave motor according to the motor structure relating to the invention.

The travelling-wave motor according to the invention may ensure an effect in realizing a high efficiency operation on a thin and small-sized structure through a simple construction wherein a vibration part is locked and supported on the central support rod installed on a ground way, disposed so as to come in pressure and contact at an output extracting position set at an inside portion coming near to outmost periphery of the vibrator part, and a driving frequency is set for excitation in a primary vibration mode radially of the vibrator part.

Accordingly, the travelling-wave motor may be utilized in the field of precision equipment. For example, when employed as a motor of an electronic timekeeper, an advantage never realized in the prior art may be secured such that a gear train can be curtailed in number and a reversible drive is realizable for the low-speed high torgue free from being influenced by magnets, and that a disturbance will hardly exert an influence for the high holding torque.

What is claimed is:

1. A method of making a piezoelectric vibrator, comprising the steps of:
    providing a disk-shaped piezoelectric member having a central hole therethrough;
    depositing a pattern of excitation electrodes on one side of the piezoelectric member, the excitation electrodes having the general shape of circular segments and being circumferentially spaced apart from one another;
    polarizing the excitation electrodes according to a predetermined pattern; and
    depositing an outer short-circuit electrode pattern on the outermost periphery of the piezoelectric member to interconnect the radial outer ends of selected ones of the excitation electrodes and depositing an inner short-circuit electrode pattern on the periphery of the central hole of the piezoelectric member to interconnect the radial inner ends of selected ones of the excitation electrodes.

2. A method according to claim 1; wherein the depositing steps are carried out by evaporative deposition.

3. A method according to claim 1; wherein the step of depositing a pattern of excitation electrodes comprises depositing the excitation electrodes so that alternate ones thereof extend radially inwardly a greater extent than the ones adjacent thereto.

4. A method according to claim 1; wherein the step of depositing a pattern of excitation electrodes comprises depositing the excitation electrodes so that alternate ones thereof extend radially outwardly a greater extent than the ones adjacent thereto.

5. A method according to claim 1; including forming a marking portion on at least one of the excitation electrodes for designating the direction of polarization of the excitation electrodes.

* * * * *